United States Patent
Huang et al.

(10) Patent No.: US 9,948,346 B2
(45) Date of Patent: Apr. 17, 2018

(54) COMMUNICATION SYSTEM WITH UP-CONVERTER AND DIGITAL BASEBAND PROCESSING CIRCUIT IMPLEMENTED IN ONE DIE SEPARATED FROM ANOTHER DIE HAVING DOWN-CONVERTER, AND RELATED COMMUNICATION METHOD THEREOF

(71) Applicant: MEDIATEK INC., Hsin-Chu (TW)

(72) Inventors: Ho-Chi Huang, Hsinchu County (TW); Paul Cheng Po Liang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 50 days.

(21) Appl. No.: 13/798,127

(22) Filed: Mar. 13, 2013

(65) Prior Publication Data
US 2014/0119416 A1    May 1, 2014

Related U.S. Application Data

(60) Provisional application No. 61/721,210, filed on Nov. 1, 2012.

(51) Int. Cl.
*H04B 1/38* (2015.01)
*H04L 5/16* (2006.01)
*H04B 1/40* (2015.01)

(52) U.S. Cl.
CPC ..................................... *H04B 1/40* (2013.01)

(58) Field of Classification Search
CPC ........................................................ H03F 3/68
See application file for complete search history.

(56) References Cited

U.S. PATENT DOCUMENTS

| | | | |
|---|---|---|---|
| 6,493,326 B1 * | 12/2002 | Ramachandran | 370/311 |
| 7,760,142 B2 | 7/2010 | Sabet | |
| 2003/0057423 A1 * | 3/2003 | Shimoda | H01L 21/6835 257/80 |
| 2005/0074946 A1 * | 4/2005 | Chu | H01L 21/76224 438/424 |

(Continued)

FOREIGN PATENT DOCUMENTS

| | | |
|---|---|---|
| CN | 1901401 A | 1/2007 |
| CN | 101313475 A | 11/2008 |

(Continued)

*Primary Examiner* — Shuwang Liu
*Assistant Examiner* — Gina McKie
(74) *Attorney, Agent, or Firm* — Winston Hsu

(57) ABSTRACT

One communication system includes a first die, a second die and a front-end circuit. The first die has an up-converter and a digital baseband (DBB) processing circuit. The second die has a down-converter. The front-end circuit couples an antenna to the first and second dies. Another exemplary communication system includes a first die, a second die and a front-end circuit. The first die performs digital baseband (DBB) processing, and generates a first signal with a higher frequency according to a second signal, wherein the second signal is derived from an output signal of the DBB processing. The second die generates a third signal with a lower frequency according to a fourth signal. The front-end circuit couples the first signal from the first die to an antenna and couples the fourth signal from the antenna to the second die.

14 Claims, 4 Drawing Sheets

(56) References Cited

U.S. PATENT DOCUMENTS

| | | | |
|---|---|---|---|
| 2006/0030277 A1* | 2/2006 | Cyr et al. ........................ | 455/77 |
| 2006/0202931 A1* | 9/2006 | Koide ................... | G02F 1/1362 |
| | | | 345/90 |
| 2007/0263667 A1* | 11/2007 | Dubuc et al. ................. | 370/500 |
| 2008/0002788 A1* | 1/2008 | Akhtar ................... | H03B 19/14 |
| | | | 375/298 |
| 2008/0205495 A1* | 8/2008 | Trott ............................ | 375/219 |
| 2008/0222596 A1* | 9/2008 | Chen ........................ | G03F 1/00 |
| | | | 716/55 |
| 2008/0311862 A1* | 12/2008 | Spina .................... | H01Q 1/525 |
| | | | 455/78 |
| 2011/0319042 A1* | 12/2011 | Soman .................... | H04B 1/18 |
| | | | 455/205 |
| 2012/0128099 A1* | 5/2012 | Morris et al. ................. | 375/297 |
| 2013/0143410 A1* | 6/2013 | Chen ................ | H01L 21/28123 |
| | | | 438/699 |
| 2014/0140138 A1* | 5/2014 | Tran ................... | G11C 16/0483 |
| | | | 365/185.18 |
| 2015/0325522 A1* | 11/2015 | Yeh ..................... | H01L 21/2855 |
| | | | 257/741 |

FOREIGN PATENT DOCUMENTS

| | | |
|---|---|---|
| CN | 101860380 A | 10/2010 |
| CN | 102457297 A | 5/2012 |
| CN | 102694566 A | 9/2012 |

\* cited by examiner

COMMUNICATION SYSTEM WITH UP-CONVERTER AND DIGITAL BASEBAND PROCESSING CIRCUIT IMPLEMENTED IN ONE DIE SEPARATED FROM ANOTHER DIE HAVING DOWN-CONVERTER, AND RELATED COMMUNICATION METHOD THEREOF

CROSS REFERENCE TO RELATED APPLICATIONS

This application claims the benefit of U.S. provisional application No. 61/721,210, filed on Nov. 1, 2012 and incorporated herein by reference.

BACKGROUND

The disclosed embodiments of the present invention relate to transmitting and receiving a wireless communication signal, and more particularly, to a communication system with an up-converter and a digital baseband processing circuit implemented in one die separated from another die having a down-converter, and a related communication method thereof.

Because of the advance of the deep sub-micro complementary metal-oxide-semiconductor (CMOS) process, digital circuits become smaller and consume less power. That is, the process scaling allows more transistors implemented in the same area or a smaller area needed for implementing the same number of transistors. Hence, to reduce the size and prolong battery life for portable devices such as mobile phones, it is desirable to implement circuits in deep sub-micron CMOS process. Regarding the radio design, there is a strong push to convert the radio-frequency (RF)/analog intensive radio parts into more digital intensive designs to take full advantage of the process scaling.

Regarding a digital radio design, it is easier to realize a digital transmitter part because the signal source is already digital, and the only thing to be considered is the in-band signal generation; however, it is harder to realize a digital receiver part because the signal source is analog, and the receiver part needs to consider in-band signals as well as out-of-band interferences/blockers. Better integration usually means smaller device size and lower cost. However, if the radio design cannot be effectively converted into the digital design to reduce the size of the radio design, integration of the radio circuits, including the digital transmitter part and the digital receiver part, will greatly increase the production cost. For example, under a more advanced semiconductor process, integrating the transmitter part and the receiver part in the same die is not a cost-efficient design.

Thus, there is a need for an innovative communication system design which is capable of making the device smaller, cheaper, and have less current consumption through proper system partition and integration.

SUMMARY

In accordance with exemplary embodiments of the present invention, a communication system with an up-converter and a digital baseband processing circuit implemented in one die which is separated from another die having a down-converter and a related communication method thereof are proposed to solve the above-mentioned problem.

According to a first aspect of the present invention, an exemplary communication system is disclosed. The exemplary communication system includes a first die, a second die and a front-end circuit. The first die has an up-converter and a digital baseband (DBB) processing circuit. The second die is separated from the first die, and has a down-converter. The front-end circuit is arranged for coupling an antenna to the first die and the second die.

According to a second aspect of the present invention, an exemplary communication system is disclosed. The exemplary communication system includes a first dies, a second die and a front-end circuit. The first die is arranged for performing digital baseband (DBB) processing, and generating a first signal according to a second signal, wherein the second signal is derived from an output signal of the DBB processing, and a frequency of the first signal is higher than a frequency of the second signal. The second die is separated from the first die and arranged for generating a third signal according to a fourth signal, wherein a frequency of the fourth signal is higher than a frequency of the third signal. The front-end circuit is arranged for coupling the first signal from the first die to an antenna and coupling the fourth signal from the antenna to the second die.

According to a third aspect of the present invention, an exemplary communication method is disclosed. The exemplary communication method includes: performing a digital baseband (DBB) processing function; performing an up-conversion function; performing a down-conversion function; and transmitting a first signal to an antenna and receiving a second signal from the antenna, wherein the first signal is derived from an output signal of the up-conversion function, and an input signal of the down-conversion function is derived from the second signal. The DBB processing function and the up-conversion function are performed by circuitry fabricated using a first semiconductor process, and the down-conversion function is performed by circuitry fabricated using a second semiconductor process different from the first semiconductor process.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
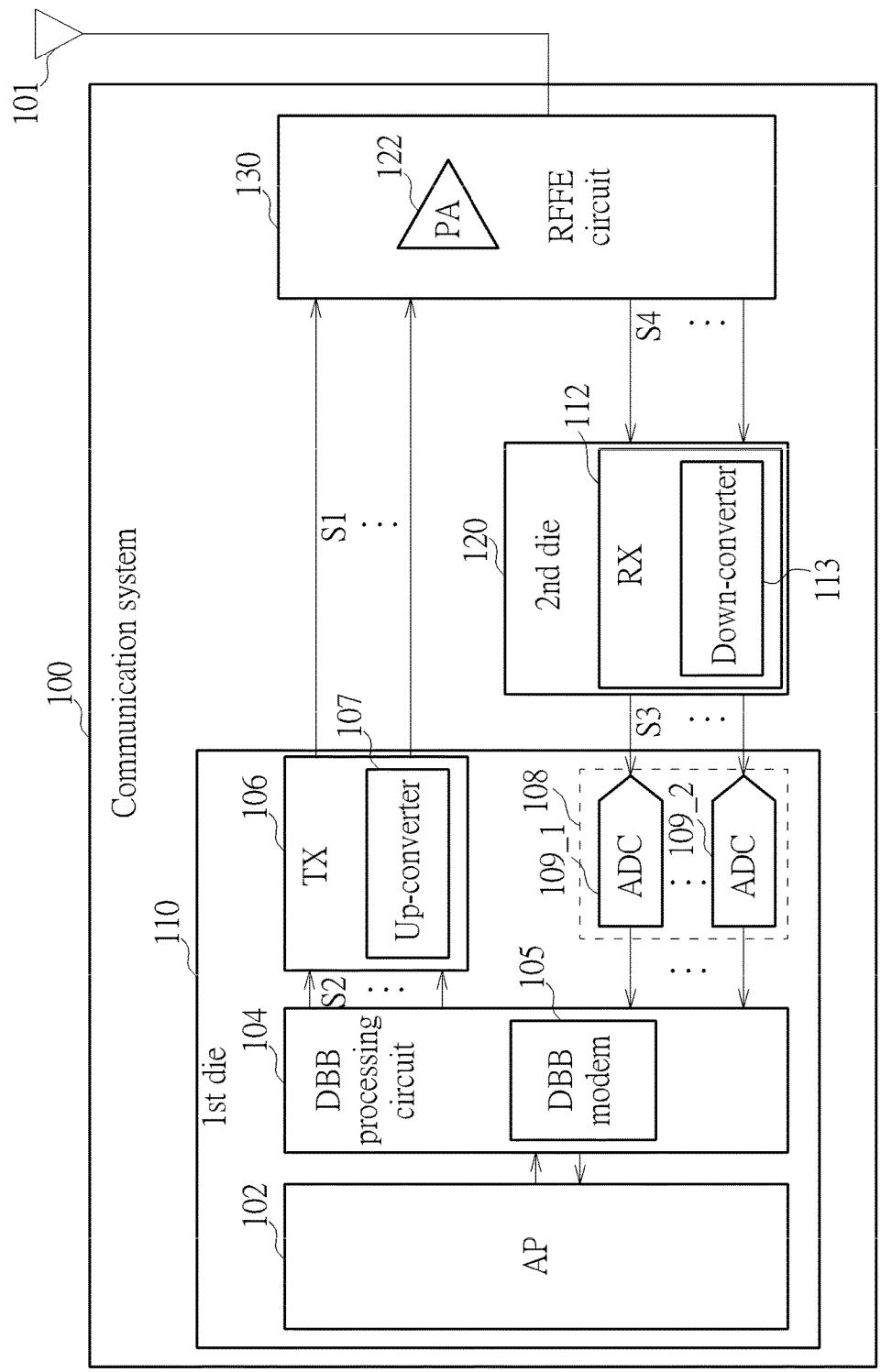
FIG. 1 is a block diagram illustrating a communication system according to a first embodiment of the present invention.

FIG. 1 is a block diagram illustrating a communication system according to a first embodiment of the present invention. The communication system 100 includes an application processor (AP) 102, a digital baseband (DBB) processing circuit 104 having a DBB modem 105, a transmitter (TX) having an up-converter 107, an analog-to-digital converting circuit 108 having one or more analog-to-digital converters (ADCs) 109_1, 109_2, a receiver (RX) 112 having a down-converter 113, and a radio-frequency front-end (RFFE) circuit 130. The DBB processing circuit 104 is coupled between the AP 102 and the TX 106, and the RX 112 is coupled to the DBB processing circuit 104 via the analog-to-digital converting circuit 108. It should be noted that AP 102, DBB processing circuit 104, TX 106, and the analog-to-digital converting circuit 108 are all disposed in a first die 110 fabricated using a first semiconductor process, and RX 112 is disposed in a second die 120 which is separated from the first die 110 and fabricated using a second semiconductor process different from the first semiconductor process. By way of example, but not limitation, the first semiconductor process is a 28 nm process, while the second semiconductor process is a 40 nm process. Hence, compared to the second semiconductor process, the first semiconductor process has a smaller geometry.

The AP 102 is a processor that processes at least one of video data, audio data, image data, and graphics data (e.g., three-dimensional (3D) graphics data). The DBB processing circuit 104 is a digital circuit arranged to process at least the baseband signal. Specifically, the DBB modem 105 is designed to perform modulation for signal transmission and demodulation for signal reception. The TX 106 is arranged to generate a first signal S1 according to a second signal S2, wherein the second signal S2 is derived from an output signal of the DBB processing circuit 104, and a frequency of the first signal S1 is higher than that of the second signal S2. For example, the second signal S2 may be a digital baseband signal or low-intermediate-frequency (low-IF) signal, and the first signal S1 may be an analog RF signal. In other words, the TX 106 is designed to be equipped with a digital-to-analog converting capability for generating the analog RF signal to the RFFE circuit 130 according to the digital baseband/low-IF signal. In the present invention, the TX 106 may be a digital or digital-intensive transmitter. Regarding the up-converter 107 included in the TX 106, it may be a digital circuit arranged to perform the desired up-conversion for converting a baseband signal or low-IF signal to an RF signal in a digital manner.

The RX 112 is arranged to perform an operation opposite to that performed by the TX 106. Hence, the RX 112 is arranged to generate a third signal S3 according to a fourth signal S4, wherein a frequency of the fourth signal S4 is higher than that of the third signal S3. For example, the third signal S3 may be an analog baseband signal or low-IF signal, and the fourth signal S4 may be an analog RF signal, including in-band signal components and out-of-band signal components (i.e., interferences/blockers). Regarding the down-converter 113 included in the RX 112, it is arranged to perform the desired down-conversion for converting an RF signal to a baseband signal or low-IF signal. The analog-to-digital converting circuit 108 is disposed in the first die 110 where the DBB processing circuit 104 is located. The analog-to-digital converting circuit 108 is arranged for receiving an analog down-converted signal and converting the received analog down-converted signal into a digital down-converted signal for further processing in the following DBB processing circuit 104, where the analog down-converted signal is derived from an output signal of the down-converter 113.

Regarding the RFFE circuit 130, it is arranged for coupling an antenna 101 to the first die 110 and the second die 120. For example, the RFFE circuit 130 may include at least one power amplifier (PA) 122, at least one switch, at least one surface acoustic wave (SAW) filter, at least one external low-noise amplifier (LNA), at least one duplexer, at least one diplexer, at least one antenna matching network, etc. Therefore, the RFFE circuit 130 is capable of coupling the aforementioned first signal S1 from the first die 110 to the antenna 101 and coupling the aforementioned fourth signal S4 from the antenna 101 to the second die 120. It should be noted that circuit components of the RFFE circuit 130 may be implemented in different dies packaged in the same chip to form a single module or may be realized using discrete passive and active components mounted on a printed circuit board (PCB).

As the present invention focuses on radio system partition and integration, further details of functionality and internal circuit architecture of each functional block shown in FIG. 1 are omitted here for brevity.

As mentioned above, it is easier to realize the digital TX because the signal source is already digital, and it is harder to realize the digital RX because the signal source is analog. In accordance with the proposed radio system partition and integration scheme as shown in FIG. 1, the TX 106 and at least the DBB processing circuit 104 are integrated within one die (i.e., the first die 110) fabricated using a more advanced semiconductor process (e.g., 28 nm process), and the RX 112 is implemented in another die fabricated using a less advanced semiconductor process (e.g., 40 nm process). Thus, the proposed radio system partition and integration scheme makes the TX 106 integrated in the first die 110 to benefit from the advantage of the process scaling, and leaves the RX 112 in the standalone second die 120 to make the overall size of the communication system 100 smaller or make the communication system 100 have a better-cost structure. In this way, the production cost of the communication system 100 would not be greatly increased by improper integration of the TX 106 and the RX 112 in the same die fabricated using a more advanced semiconductor process. A balance between system integration and production cost is achieved through such an asymmetric arrangement of the TX 106 and the RX 112.

Figure 2:
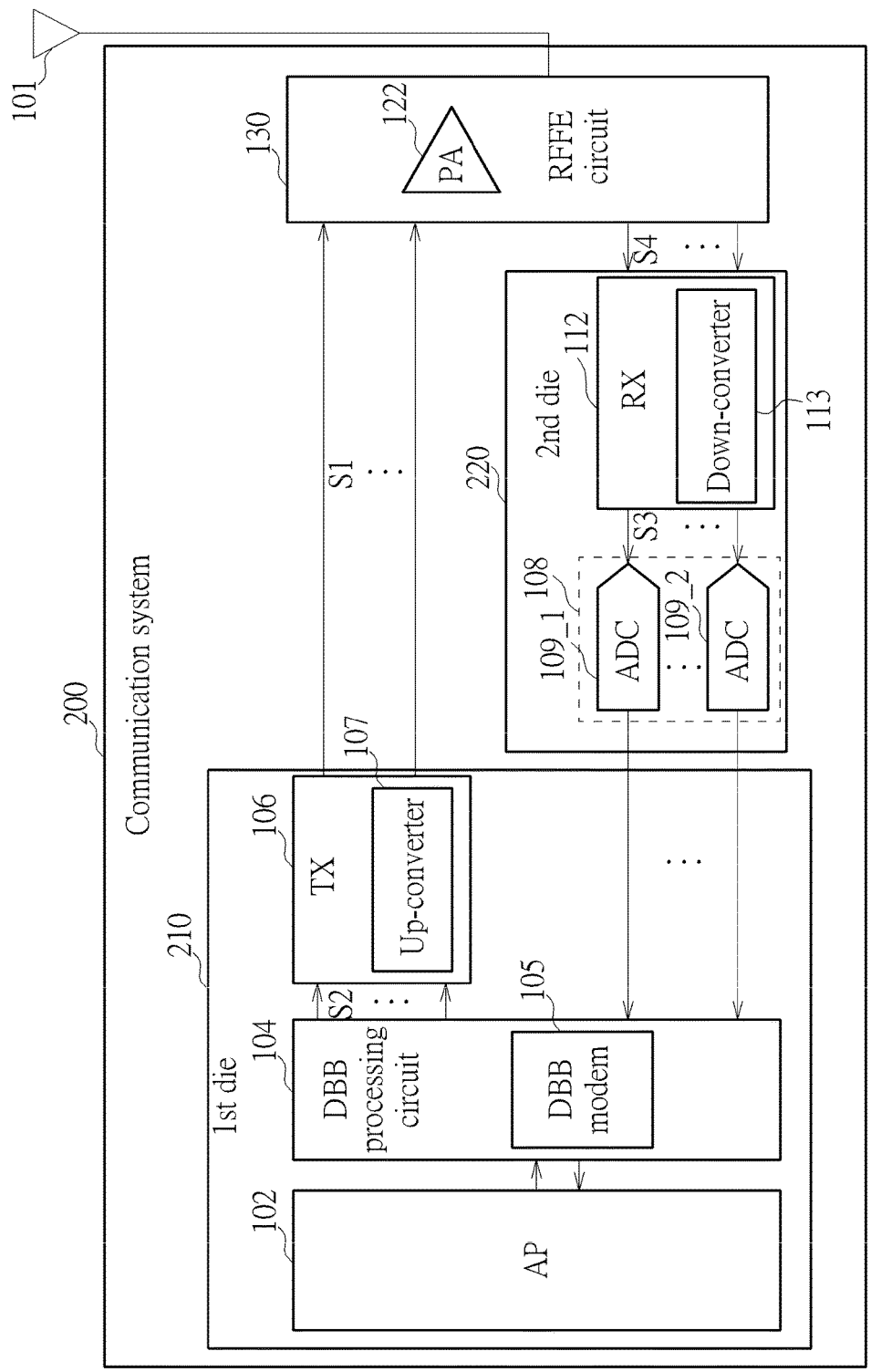
FIG. 2 is a block diagram illustrating a communication system according to a second embodiment of the present invention.

FIG. 2 is a block diagram illustrating a communication system according to a second embodiment of the present invention. The major difference between the communication systems 100 and 200 is the location of the analog-to-digital converting circuit 108. As shown in FIG. 2, the first die 210 includes the aforementioned AP 102, DBB processing circuit 104 and TX 106, and the second die 220 includes the aforementioned analog-to-digital converting circuit 108 and RX 112. In this embodiment, the first die 210 is fabricated using a first semiconductor process, and the second die 220 is separated from the first die 210 and fabricated using a second semiconductor process different from the first semiconductor process. By way of example, but not limitation, the first semiconductor process is a 28 nm process, while the second semiconductor process is a 40 nm process. Hence, compared to the second semiconductor process, the first semiconductor process has a smaller geometry. The signal transmission from the second die 220 to the first die 210 includes digital signals. Hence, the communication system 200 therefore has a digital interface between the first die 210 and the second die 220. As a person skilled in the art can readily understand details of each functional block shown in FIG. 2 after reading above paragraphs directed to the embodiment shown in FIG. 1, further description is omitted here for brevity.

Figure 3:
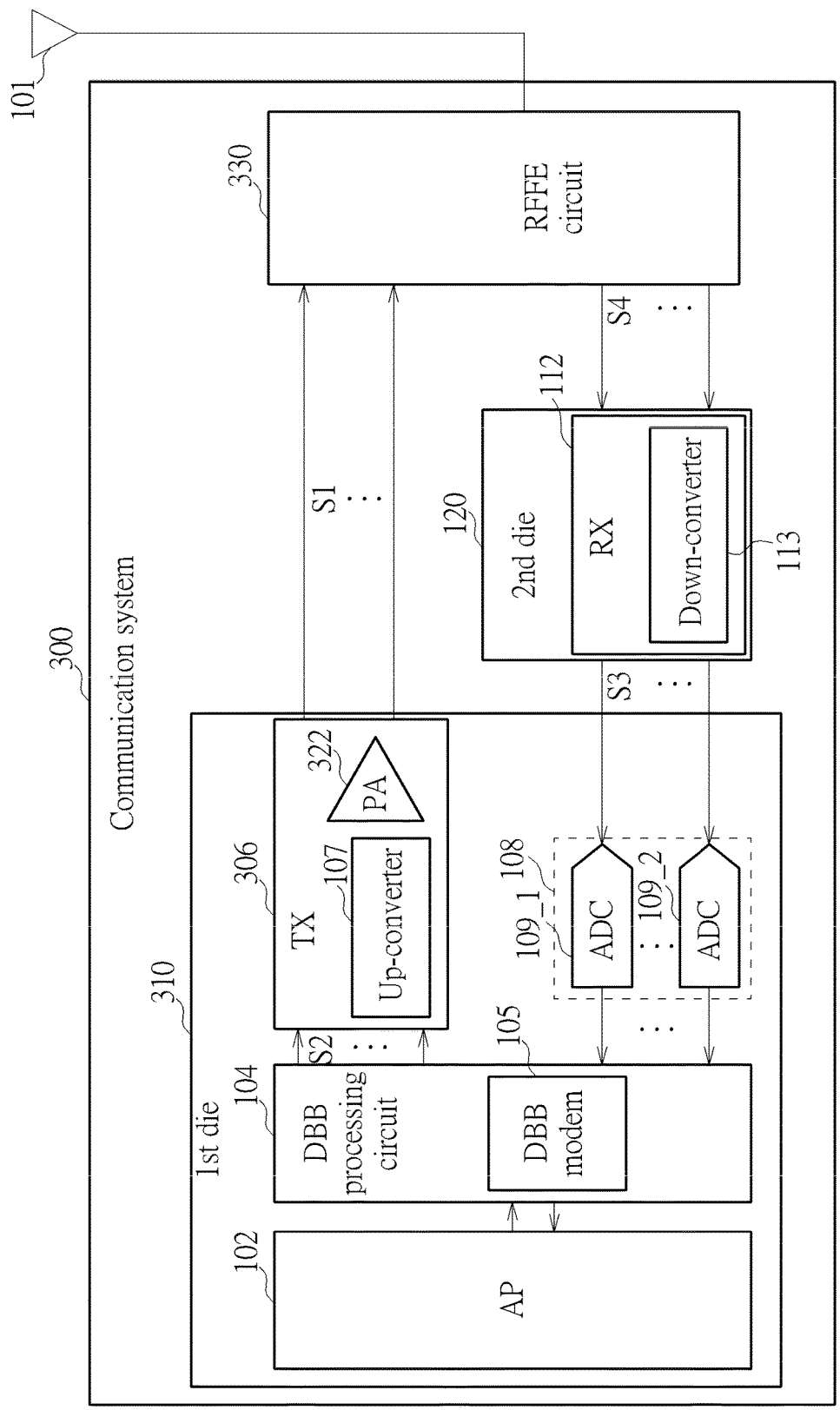
FIG. 3 is a block diagram illustrating a communication system according to a third embodiment of the present invention.

In above embodiments, the PA 122 is disposed in the RFFE circuit 130 which is external to the first die 110/210. However, this is for illustrative purposes only, and is not meant to be a limitation of the present invention. Please refer to FIG. 3, which is a block diagram illustrating a communication system according to a third embodiment of the present invention. The major difference between the communication systems 100 and 300 is the location of the power amplifier. As shown in FIG. 3, the RFFE circuit 330 of the communication system 300 does not have the power amplifier included therein. Instead, a power amplifier (PA) 322, such as a digital power amplifier (DPA), is integrated within TX 306 of the first die 310 for performing power amplification upon an RF signal derived from an up-converted signal generated by the up-converter 107. Hence, the first signal S1 with amplified amplitude is transmitted from the first die 310 to the RFFE circuit 330. In this embodiment, the first die 310 is fabricated using a first semiconductor process, and the second die 120 is separated from the first die 310 and fabricated using a second semiconductor process different from the first semiconductor process. By way of example, but not limitation, the first semiconductor process is a 28 nm process, while the second semiconductor process is a 40 nm process. Hence, compared to the second semiconductor process, the first semiconductor process has a smaller geometry. As a person skilled in the art can readily understand details of each functional block shown in FIG. 3 after reading above paragraphs directed to the embodiment shown in FIG. 1, further description is omitted here for brevity.

Figure 4:
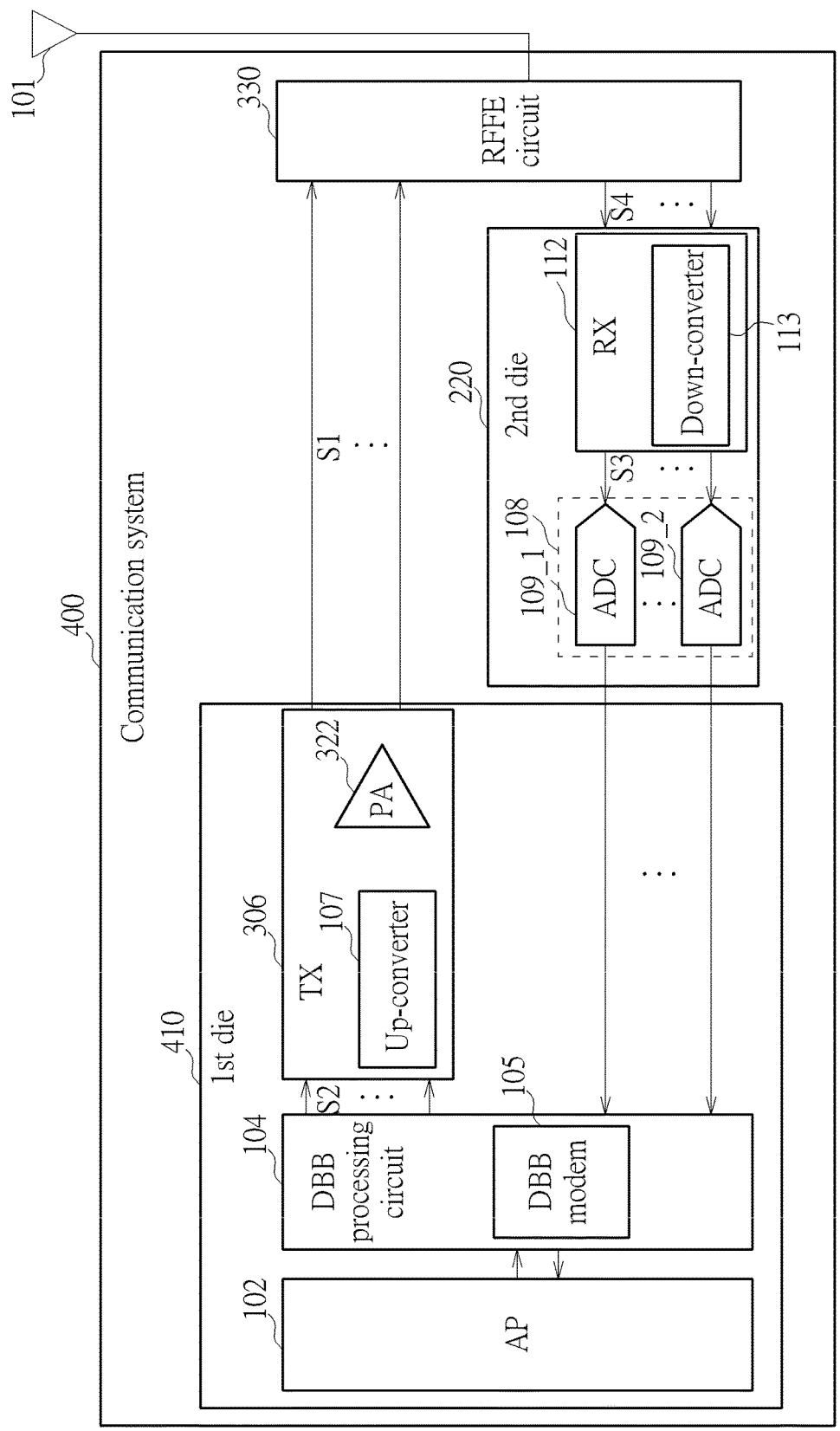
FIG. 4 is a block diagram illustrating a communication system according to a fourth embodiment of the present invention.

Please refer to FIG. 4, which is a block diagram illustrating a communication system according to a fourth embodiment of the present invention. The major difference between the communication systems 300 and 400 is the location of the analog-to-digital converting circuit 108. As shown in FIG. 4, the first die 410 includes the aforementioned AP 102, DBB processing circuit 104 and TX 306, and the second die 220 includes the aforementioned analog-to-digital converting circuit 108 and RX 112. In this embodiment, the first die 410 is fabricated using a first semiconductor process, and the second die 220 is separated from the first die 410 and fabricated using a second semiconductor process different from the first semiconductor process. By way of example, but not limitation, the first semiconductor process is a 28 nm process, while the second semiconductor process is a 40 nm process. Hence, compared to the second semiconductor process, the first semiconductor process has a smaller geometry. The signal transmission from the second die 220 to the first die 410 includes digital signals. Hence, the communication system 400 therefore has a digital interface between the first die 410 and the second die 220. As a person skilled in the art can readily understand details of each functional block shown in FIG. 4 after reading above paragraphs directed to the embodiment shown in FIG. 1, further description is omitted here for brevity.

In the embodiments mentioned above, each of the first dies 110, 210, 310, 410 has one application processor arranged to perform an application based processing function. However, this is for illustrative purposes only, and is not meant to be a limitation of the present invention. That is, the AP 102 may be an optional component, depending upon actual design consideration/requirement. For example, in an alternative design, an application processor is implemented in a standalone die, and the first die 110/210/310/410 may be modified to omit the AP 102. This also falls within the scope of the present invention.

Briefly summarized, each system partition and integration scheme proposed in the present invention takes the advantage of the transmitter digitization, which makes the communication system more cost effective and energy efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication system, comprising:
   a first die, comprising an up-converter and a digital baseband (DBB) processing circuit;
   a second die, separated from the first die and comprising a down-converter; and
   a front-end circuit, arranged for coupling an antenna to the first die and the second die, wherein the front-end circuit is located on a transmitting signal path between the first die and the antenna, and the front-end circuit is also located on a receiving signal path between the antenna and the second die;
   wherein the first die is a semiconductor die of a first semiconductor process, the second die is a semiconductor die of a second semiconductor process, and the first semiconductor process is different from the second semiconductor process;
   wherein the first semiconductor process is an X nanometer (nm) process, the second semiconductor process is a Y nm process, X and Y are positive values, and X is smaller than Y.

2. The communication system of claim 1, wherein the DBB processing circuit comprises a DBB modem arranged for performing modulation and demodulation.

3. The communication system of claim 1, wherein the first die further comprises an analog-to-digital converting circuit arranged for receiving an analog down-converted signal and converting the received analog down-converted signal into a digital down-converted signal, where the analog down-converted signal is derived from an output signal of the down-converter.

4. The communication system of claim 1, wherein the second die further comprises an analog-to-digital converting circuit arranged for receiving an analog down-converted signal derived from an output signal of the down-converter and converting the received analog down-converted signal into a digital down-converted signal.

5. The communication system of claim 1, wherein the first die further comprises a power amplifier arranged for amplifying a radio-frequency (RF) signal derived from an output signal of the up-converter.

6. The communication system of claim 1, wherein the first die further comprises an application processor arranged for processing at least one of video data, audio data, image data, and graphics data.

7. The communication system of claim 1, wherein the up-converter is part of a digital transmitter.

8. A communication system, comprising:
   a first die, arranged for performing digital baseband (DBB) processing, and generating a first signal according to a second signal, wherein the second signal is derived from an output signal of the DBB processing, and a frequency of the first signal is higher than a frequency of the second signal;

a second die, separated from the first die and arranged for generating a third signal according to a fourth signal, wherein a frequency of the fourth signal is higher than a frequency of the third signal; and a front-end circuit, arranged for coupling the first signal from the first die to an antenna and coupling the fourth signal from the antenna to the second die, wherein the front-end circuit is external to each of the first die and the second die, wherein the front-end circuit is located on a transmitting signal path between the first die and the antenna, and the front-end circuit is also located on a receiving signal path between the antenna and the second die;

wherein the first die is a semiconductor die of a first semiconductor process, the second die is a semiconductor die of a second semiconductor process, and the first semiconductor process is different from the second semiconductor process;

wherein the first semiconductor process is an X nanometer (nm) process, the second semiconductor process is a Y nm process, X and Y are positive values, and X is smaller than Y.

9. The communication system of claim 8, wherein the digital baseband (DBB) processing includes modulation and demodulation.

10. The communication system of claim 8, wherein the first die is further arranged for performing an analog-to-digital conversion to receive an analog signal and convert the received analog signal into a digital signal, where the analog signal is derived from the third signal.

11. The communication system of claim 8, wherein the second die is further arranged for performing an analog-to-digital conversion to receive an analog signal derived from the third signal and converting the received analog signal into a digital signal.

12. The communication system of claim 8, wherein the first die is further arranged for performing power amplification upon a radio-frequency (RF) signal derived from the first signal.

13. The communication system of claim 8, wherein the first die is further arranged for processing at least one of video data, audio data, image data, and graphics data.

14. The communication system of claim 8, wherein the step of generating the first signal according to the second signal is performed by a digital manner.

* * * * *